US012649288B2

(12) United States Patent
del Pozo Colina

(10) Patent No.: US 12,649,288 B2
(45) Date of Patent: Jun. 9, 2026

(54) METHOD FOR MANUFACTURING A LIGHTWEIGHT VENEER SYSTEM

(71) Applicant: Wish Stone LLC, Miramar, FL (US)

(72) Inventor: Santiago del Pozo Colina, Miramar, FL (US)

( * ) Notice: Subject to any disclaimer, the term of this patent is extended or adjusted under 35 U.S.C. 154(b) by 306 days.

(21) Appl. No.: 18/582,479

(22) Filed: Feb. 20, 2024

(65) Prior Publication Data

US 2025/0262799 A1 Aug. 21, 2025

(51) Int. Cl.

| | |
|---|---|
| *B29C 67/24* | (2006.01) |
| *B28B 1/00* | (2006.01) |
| *B28B 11/24* | (2006.01) |
| *B28C 9/00* | (2006.01) |
| *C04B 14/28* | (2006.01) |
| *C04B 14/42* | (2006.01) |
| *C04B 26/06* | (2006.01) |
| *E04F 13/15* | (2006.01) |
| *B28B 1/08* | (2006.01) |
| *C04B 103/54* | (2006.01) |
| *C04B 111/00* | (2006.01) |
| *C04B 111/54* | (2006.01) |

(52) U.S. Cl.
CPC ............ *B29C 67/242* (2013.01); *B28B 1/008* (2013.01); *B28B 11/245* (2013.01); *B28C 9/002* (2013.01); *C04B 14/285* (2013.01); *C04B 14/42* (2013.01); *C04B 26/06* (2013.01); *E04F 13/15* (2013.01); *B28B 1/08* (2013.01); *C04B 2103/54* (2013.01); *C04B 2111/00482* (2013.01); *C04B 2111/54* (2013.01)

(58) Field of Classification Search
None
See application file for complete search history.

(56) References Cited

U.S. PATENT DOCUMENTS

| | | | | |
|---|---|---|---|---|
| 3,278,662 | A * | 10/1966 | Mangrum | C08F 291/00 |
| | | | | 264/77 |
| 4,346,050 | A * | 8/1982 | Trent | B29C 67/242 |
| | | | | 523/521 |
| 8,481,611 | B2 * | 7/2013 | Oh | C04B 26/18 |
| | | | | 523/171 |
| 10,315,956 | B2 * | 6/2019 | Morrison | B44D 5/10 |
| 2020/0354968 | A1 * | 11/2020 | Attebery | E04F 13/0894 |

* cited by examiner

*Primary Examiner* — Benjamin A Schiffman
(74) *Attorney, Agent, or Firm* — Mariana I. Vernieri

(57) ABSTRACT

A lightweight veneer system and method for producing a construction material that simulates the appearance of natural finishes such as stone, brick, or exposed concrete while providing improved technical characteristics. The system incorporates a precise sequence of mixing water, acrylic polyester resin, recycled ground glass, calcium carbonate, fiberglass, and iron oxides for coloration, followed by the addition of white or gray cement and plaster. The specialized process involves treating molds with release agents and pigments to ensure natural-looking textures and colors. The material is then poured into molds, vibrated to remove air pockets, and cured in a controlled environment to achieve optimal hardness and moisture content. The final product is significantly lighter than conventional materials, offering advantages in transportation and installation. This environmentally conscious method includes recycling of both water and defective materials back into the production process, emphasizing sustainability alongside industrial efficiency.

3 Claims, 3 Drawing Sheets

METHOD FOR MANUFACTURING A LIGHTWEIGHT VENEER SYSTEM

TECHNICAL FIELD

This invention relates generally to the field of construction materials. More particularly, this invention relates to a novel lightweight veneer system, which represents a significant advancement in the use of reconstituted stone.

BACKGROUND OF THE INVENTION

The concept of reconstituted stone, also known as artificial stone, manufactured stone, or architectural concrete, was developed in the 1950s, driven by the need for affordable and sustainable alternatives to natural stone. It aimed to mimic the appearance and texture of natural stone while offering similar aesthetic and durability characteristics. Reconstituted stone is produced by mixing cement, aggregates (stones and sands), and pigments, then molding them into various shapes and textures resembling natural stones, bricks, wood, iron, exposed concrete, etc. Over the years, advancements in manufacturing technology and materials have significantly enhanced the quality and appearance of these products, boosting their market demand. In addition to this, now with lighter constructions, a lighter and easier to install coating system is imminent, even improving its appearance and durability.

Commonly used in both residential and commercial applications, reconstituted stone finds its place in building facades, interior and exterior wall cladding, fireplaces, landscaping, and decoration. Its benefits include lower costs compared to natural stone, lighter weight aiding in installation and transport, and greater resistance to deterioration and weathering.

The rising emphasis on environmental consciousness and sustainability in the construction industry has further elevated the appeal of reconstituted stone. Its lower environmental impact, when compared to natural stone extraction, and its recyclability, supported by proper management of water and recycled materials, make it an eco-friendlier choice.

However, despite these innovations in design, the weight of the available products is still a limitation for market growth and acceptance, partly due to rising transportation costs, scarcity of specialized labor, and a preference for lighter construction systems.

A lightweight veneer system and method that, thanks to an innovative production process including mixing, filling, color application, burning, demolding, and setting, achieves an exceptionally lightweight material with a fine, clean, dust-free, and pore-free finish being at least 70% lighter than current alternatives of reconstituted stone, would be a significant advancement to the field, particularly so if it does not require specialized labor for installation, enabling consumer-driven installation, and it uses recycled raw materials to minimize environmental impact.

SUMMARY OF THE INVENTION

The invention discloses an innovative lightweight veneer system and method for producing a construction material, which we refer to as reconstituted stone. This material mimics various natural finishes such as stone, brick, or exposed concrete, but with significantly improved technical characteristics. The invention leverages a unique formula comprising cement, plaster, marble grain, lightweight aggregates, water, and resins, producing a consistent and aesthetically pleasing material. Furthermore, the formula is suitable for different applications, for example for lightweight acoustic and thermal coatings.

Key Features

The method involves a precise mixing process, where components like water, white or gray cement, polyester acrylic resin, recycled ground glass, calcium carbonate, fiberglass, and iron oxides for coloration are blended in specific sequences. The process ensures the mix does not dry prematurely and retains workability for a longer period. This technique incorporates various materials in different proportions to create distinct textures and colors.

A concrete mixer machine, calibrated for mixtures in small quantities, is used to combine the materials efficiently, ensuring a homogeneous mixture that can be filled into molds without settling or drying. The molds are pre-treated with release agents and optionally colored for desired aesthetics. The curing process includes an initial controlled environment with specific temperature and humidity settings, facilitating gradual drying over 72 hours without compromising the technical characteristics of the material.

The resulting product is notably lighter, between 60% and 80% lighter than conventional reconstituted stone, resulting in significant reductions in transportation costs and logistical complexities. The ease of installation is such that even consumers can perform it without specialized labor, and without creating dust or requiring modifications to their homes.

This lightweight veneer system method is not only innovative in terms of the production process but also sustainable. The materials used, such as white or gray Portland cement, masonry plaster, calcium carbonate or marble dust, recycled blown glass, and water, make up a unique blend that contributes to the exceptional properties of the finished product. The use of recycled materials and the ability to recycle defective outputs back into the process underscore the environmental consideration at the core of this invention.

A lightweight veneer in accordance with the present invention is achieved by combining some or all of the following aspects:

Materials

1. Water: 32 liters (±10% tolerance)
2. Acrylic polyester resin: 1 kg (±5% tolerance)
3. Recycled ground glass: 9 kg (±5% tolerance)
4. Calcium carbonate (marble dust): 6 kg (±10% tolerance)
5. Fiberglass: 30 grams (±10% tolerance)
6. Iron oxide pigments: Quantity as required for desired color (exact amount varies by desired shade)
7. White or gray cement: 21.5 kg (±5% tolerance)
8. Plaster: 9 kg (±10% tolerance)
9. Release agent: As required for mold coating (application thickness may vary)

Variants in Materials

Cement: Portland cement type I/II can be used as an alternative to white or gray cement, adjusting the amount as needed for desired strength and color.

Aggregates: Lightweight aggregates such as expanded perlite or volcanic ash can be substituted for a portion of the ground glass to alter texture or insulation properties.

Resin: Epoxy or polyurethane resins can be used instead of acrylic polyester resin for different curing times or material properties.

Gypsum: Up to a 4% of gypsum in powder form can be added to the mixture.

Infrastructure and Equipment

To execute the method for producing lightweight veneer or reconstituted stone, the following infrastructure and equipment are essential:

1. Concrete Mixer Machine: A robust concrete mixer is needed to mix the heavy and dense materials. It is a machine that helps in the precise mixing of the formula and generates a mixture that is controlled in its process and ready for the filling point.
2. Molds: Various molds made from materials like silicone, polyurethane, or ABS to shape the veneer.
3. Mold Pre-Cleaning Equipment: Liquid vaseline and air guns for cleaning the molds prior to application of the release agent.
4. Release Agents: Agents that assist in easily releasing the veneer from the molds after setting.
5. Air Gun or Brush for Painting: For applying iron oxide pigments in desired colors on mold textures.
6. Release Agent Applicator: Equipment or tools for applying release agents to the molds to prevent sticking.
7. Vibrating Table: A table or platform that vibrates to remove air pockets and ensure a dense and even fill within the molds.
8. Primary Curing area: A controlled environment for the initial 24-hour curing process.
9. Secondary Curing Area: An additional controlled space for further curing and hardening of the material after demolding, for 48 hours, with regulated temperature (25 to 35 degrees Celsius) and humidity (50 to 60%).
10. Climate Control Systems: Systems to maintain specific temperature and humidity levels during the curing phases.
11. Moisture Meter: A device to measure the moisture content of the veneer to ensure it is below the required 20% before packaging.
12. Drying Racks: Racks or shelving where the veneer can be placed during the curing process to allow air circulation.
13. Packaging Station: An area with the necessary tools and materials for boxing and palletizing the finished product.
14. Safety Equipment: Personal protective equipment for workers, including masks, gloves, and goggles.
15. Material Storage: Facilities to store raw materials like cement, glass, and pigments, ensuring they are kept dry and uncontaminated.
16. Waste Management System: A system for recycling defective materials and managing waste, possibly including a grinding machine to process unusable pieces back into the production cycle.
17. Water Supply and Management: A reliable water source and a system for water recovery and recirculation, including filtration and sedimentation tanks if necessary.
18. Mixing and Measurement Tools: Tools and scales for accurately measuring and adding the raw materials into the mixer.

19. Transportation Equipment: Equipment such as forklifts or hand trucks to move materials and finished products between different stations.
20. Loading Dock: A space for shipping and receiving goods, facilitating easy loading and unloading of materials and products.
21. Quality Control Lab: A small lab space to test batches for consistency, strength, and other quality parameters.
22. Maintenance Tools: Equipment for the upkeep and repair of the mixers, molds, and other machinery.

Process

1. Prepare Molds:
2. Coat the molds Prepare the Mixer: Ensure the concrete mixer is clean and ready for use.
3. Mix Liquids: Combine water and acrylic polyester resin in the mixer. Stir until fully blended.
4. Add Glass: Introduce recycled ground glass to the liquid mixture and mix for 1-2 minutes.
5. Incorporate Fillers: Add calcium carbonate to the mixer and blend for an additional 1-2 minutes.
6. Reinforce: Include fiberglass into the mixture, mixing for roughly 1 minute.
7. Colorize: Gradually add iron oxide pigments into the mixture to achieve the desired color, mixing briefly to disperse the pigment evenly.
8. Add Cement: Pour white or gray cement into the mix and combine for another 1-2 minutes.
9. Final Addition: Add plaster last, mixing thoroughly for 30-60 seconds to avoid any clumping.
   a. with a release agent to ensure easy removal of the veneer after setting.
   b. Mold Pre-Cleaning: Use liquid Vaseline or an air gun for cleaning.
   c. Release Agent Application: Apply using an air gun, with a mixture of linseed oil and diesel (2:1 ratio).
   d. Color Application to Molds: Paint molds with iron oxide pigments using an air gun or brush for a natural finish.
10. Fill Molds: Pour the mix into molds, filling them within 5-8 minutes of the final mix to prevent premature hardening.
11. Vibrate: Use a vibrating table or tool to eliminate air pockets and ensure a dense fill.
12. Cure: Cover the molds with plastic and place in a controlled environment to cure, maintaining the temperature and humidity at optimal levels for 24 hours.
13. Demold and Cure: After the initial cure, demold the veneer and move to a secondary curing area with controlled climate for further hardening.
14. Dry and Test: After a total of 72 hours, ensure the veneer's moisture content is below 20% before handling.
15. Package: Once dry and hard, package the veneer for shipping or storage.

Variants in Process

Curing Temperature: 25° C. to 35° C.
Curing Humidity: 40% to 60%.
Mixing Time: Adjust as needed for homogeneity.
Vibration: Tailor duration and intensity.

The specific steps and procedures described herein for the production of the lightweight veneer system are provided as examples and should not be construed as limiting. Variations and modifications to these steps may be made without departing from the scope and spirit of the invention. It is recognized that those skilled in the art may make changes in the specific implementation and arrangement of these process steps while achieving comparable results and fulfilling similar purposes. Such alternative implementations and variations are to be considered as part of the invention, which is limited only by the scope of the appended claims and their equivalents.

DETAILED DESCRIPTION AND BEST MODE OF IMPLEMENTATION

Figure 1:
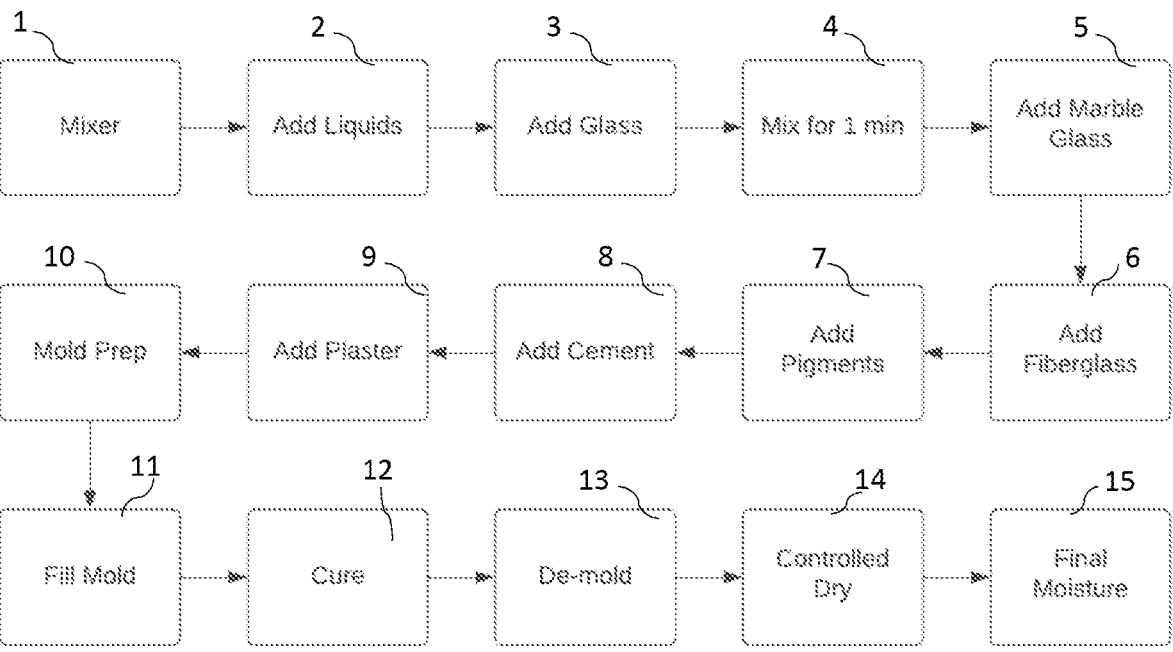
FIG. 1 is a flow chart illustrating the production process for an embodiment of a Lightweight Veneer System and Method in accordance with the present invention.

Disclosed is a lightweight veneer system and method to produce reconstituted stone, which emulates natural finishes like stone, brick, or exposed concrete with enhanced technical characteristics. The inventive method utilizes a unique formula including precise quantities and qualities of cement, plaster, marble grain, lightweight aggregates, water, and resins and combining them through specific and innovative process steps to produce a lighter, consistent, aesthetically superior material adaptable to various applications including acoustic and thermal coatings. Key to the process is a precise mixing sequence involving water, cement, polyester acrylic resin, recycled ground glass, calcium carbonate, fiberglass, and iron oxides for coloration. The mixing is conducted in a specially calibrated concrete mixer machine to ensure homogeneity, and molds pre-treated with release agents are used for shaping, followed by a controlled curing process to retain the material's technical attributes. The end product is up to 70% lighter than traditional reconstituted stone, significantly cutting transportation costs and easing installation to the extent that consumers can do it themselves, dust-free. Additionally, this method stands out for its sustainability, leveraging recycled materials and allowing for the reintegration of defects back into the cycle, reflecting the environmental ethos of the invention.

Some general aspects of the present invention have been summarized so far in the first part of this this detailed description and in the previous sections of this disclosure. Hereinafter, a detailed description of the invention as illustrated in the drawings will be provided. While some aspects of the invention will be described in connection with these drawings, it is to be understood that the disclosed embodiments are merely illustrative of the invention, which may be embodied in various forms. The specific materials, methods, structures and functional details disclosed herein are not to be interpreted as limiting. Instead, the intended function of this disclosure is to exemplify some of the ways—including the presently preferred ways—in which the invention, as defined by the claims, can be enabled for a Person of Ordinary Skill in the Art. Therefore, the intent of the present disclosure is to cover all variations encompassed within the spirit and scope of the invention as defined by the appended claims, and any reasonable equivalents thereof.

Referring to the drawings in more detail, FIG. 1 illustrates a flow chart of the production process for an embodiment of a Lightweight Veneer System and Method in accordance with the present invention. The depicted flow chart provides a comprehensive guide through various stages, designated by reference numbers (1) through (15), which detail the precise sequence of operations to fabricate a veneer product utilizing a specialized mixer and a controlled environment to ensure the consistency and desired qualities of the end material.

Initially, at step (1), a 400-liter capacity mixer, specifically a planetary mixer, is prepared. This mixer is integral to the process as it automatically incorporates various aggregates in precise proportions, as stipulated by the preset formula. The mixer's choice ensures that both heavy and lightweight aggregates are thoroughly combined to achieve a homogeneous mixture. Information about the subsequent steps, (2) to (9), should be entered into the mixer's software for the automatic discharge of the elements. In some embodiments, however, similar results can be achieved by using a different kind of mixer or even by adding the materials manually, even modifying the order of some of the steps, without departing of the spirit and scope of the present invention, if the general proportions are maintained within the tolerance parameters defined in the present specification.

At step (2), the process continues with the addition of thirty-two liters of water into the mixer. This water is pre-mixed with one kilogram of acrylic polyester resin to initiate the mixing process. Subsequently, at step (3), nine kilograms of recycled ground blown glass is introduced into the mixture. The mixer is then activated to blend the glass with the water and resin mixture for a specified duration of one to two minutes in step (4), allowing the water and ground blown glass to thoroughly combine. Following this, at step (5), six kilograms of marble dust, essentially calcium carbonate, is added to the mixture and is allowed to mix for an additional minute, ensuring even distribution within the mix. To reinforce the mixture, thirty grams of fiberglass are included as per step (6). The fiberglass is mixed for approximately one minute to ensure it is evenly dispersed throughout the material. Although not part of all embodiments of the present invention, at step (7), various metal oxides can be incorporated into the mix to achieve the desired color. This step allows for customization of the final product to suit specific aesthetic requirements. In step (8), twenty-one point five kilograms of cement are added, gray or white depending on the desired final color of the product. This mixture is then allowed to blend for two minutes to achieve a uniform consistency. At step (9), the mixture receives nine kilograms of masonry plaster, which is integrated into the mix by allowing thirty seconds to a minute for thorough blending. Afterward, the mixer's gate is opened. The mixture is ready to begin filling the molds.

Prior to filling the molds, the preparation of these molds is crucial as outlined in step (10). A mold release agent is applied to ensure that the subsequent demolding process is smooth and does not damage the material. Depending on the final texture and color required for the product, step (10) also involves painting the mold or applying a special finish in preparation for the filling process. The mixture is then transferred into the molds within a seven-minute window as specified in step (11), ensuring the mixture does not begin to set before it is poured. When filling the various molds give them gentle vibration. At step (12), the filled molds are covered with plastic and placed in a curing room. The temperature of this room is carefully controlled to remain between twenty to thirty degrees Celsius, which is vital for the curing process, and humidity should be kept between fifty percent and sixty percent. After twenty-four hours, as indicated in step (13), the material is demolded and, in step (14) it is placed in a drying room for forty-eight hours. The controlled temperature and humidity conditions ensure that the material dries properly without losing any properties. Finally, step (15) entails verifying that the material's moisture content is below twenty percent before proceeding with the packaging process, which involves boxing and palletizing the finished product for dispatch.

This detailed process, as described through steps (1) to (15), exemplifies the embodiment of the Lightweight Veneer System and Method, showcasing the intricate steps and care taken to ensure a high-quality final product. The invention is capable of variations and modifications within the scope of the appended claims and their equivalents, and such variations are also intended to be encompassed by the present disclosure.

Figure 2:
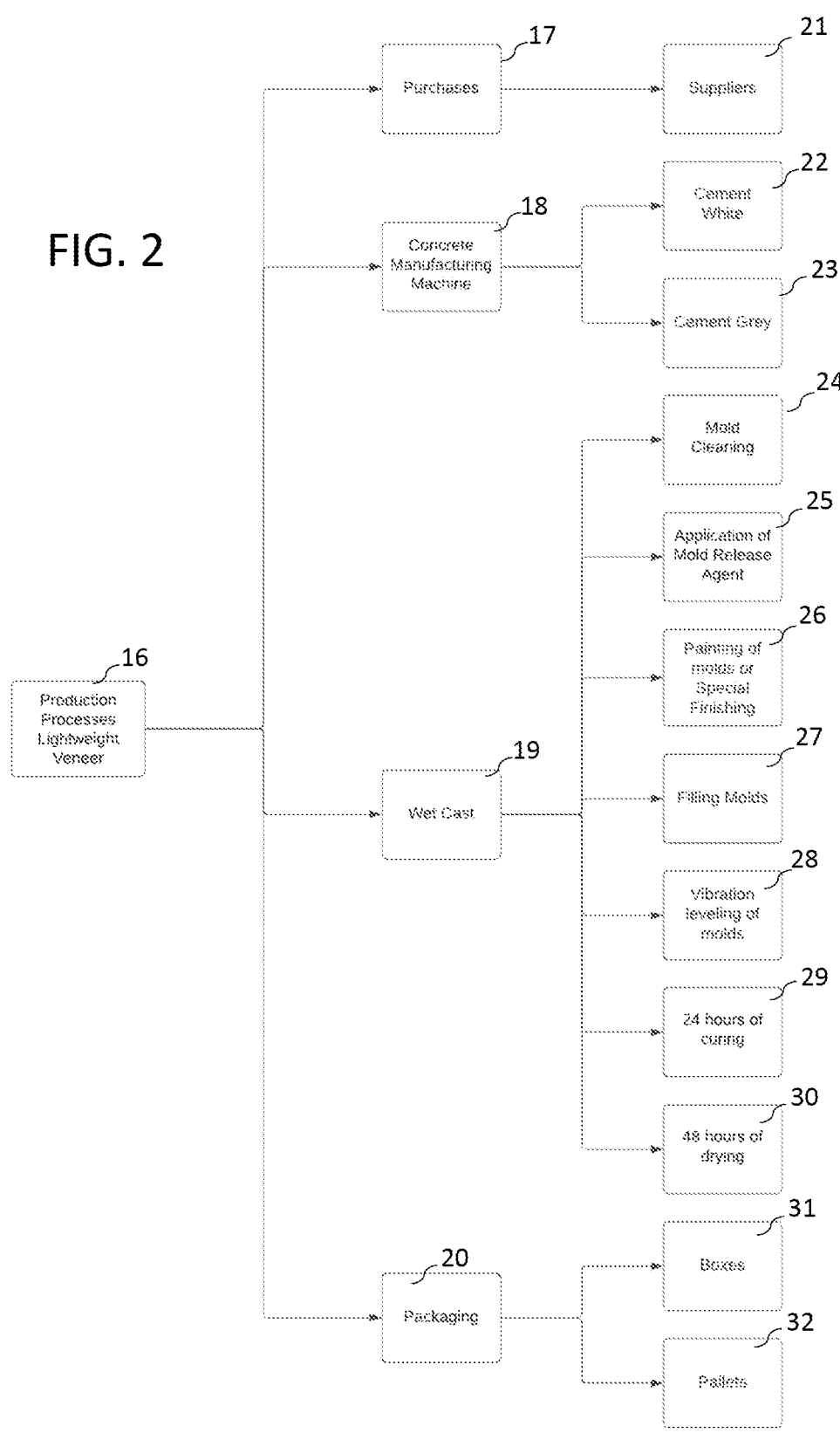
FIG. 2 is block chart illustrating the elements intervening in an embodiment of a Lightweight Veneer System and Method in accordance with the present invention.

Turning to FIG. 2, presented is a block diagram that illustrates the various components involved in an embodiment of the Lightweight Veneer System and Method in accordance with the present invention. This figure details the supply and preparation logistics that are integral to the production process, showcasing the systematic approach taken from procurement to final packaging of the veneer product. The main production processes (16) of lightweight veneer are: Purchases (17), The Concrete manufacturing machine or Mixer (18), The wet cast (19) and the packaging (20).

Going into each of them with more details, purchases (17) involves the procurement of necessary supplies based on the established formula. These materials range from the fundamental constituents of the product to various color pigments and release agents, all sourced from qualified suppliers (21) to ensure consistent quality and timely delivery to the manufacturing plant as per production orders. The Concrete manufacturing machine or Mixer (18) consistent with the specifications described in step (1) of FIG. 1, is used as described in steps (2) to (9) of FIG. 1. This includes adjustments for mix size, mixing times, and methods, ensuring a homogeneous and well-mixed product that is directly discharged into molds. Although the machinery is standard and does not per-se constitute a novel patentable feature, its optimization for the unique lightweight veneer formula is critical for ensuring product quality, regardless of whether the cement used is white (22) or gray (23). The Wet Cast process at reference number (19) is meticulous, corresponding to steps (10) to (15) of FIG. 1. Beginning with the cleaning of molds (24) with liquid vaseline or an air gun to remove any residues. The application of a mold release agent (25), either a specialized brand or a homemade mixture of two parts of linseed oil with one part of diesel, is then sprayed on without overloading. The molds are then painted (26) with an air gun or brush, depending on the model, using iron oxides in the chosen color. The application over the mold textures is done in an intentionally irregular and sporadic manner to mimic the variegated patterns of natural finishes. The molds are afterwards filled with the mixture (27) and vibrated (28) to compact the contents. The curing (29) and drying (30) of the cast products are carefully controlled. The initial twenty-four hours of curing (29) occur in a regulated environment with specific temperature and humidity parameters to ensure proper material setting without compromising its technical characteristics. The subsequent forty-eight hours of drying (30) involve placing the product on air-circulated racks to optimize the curing process and shorten the overall curing time. Lastly, the packaging process (20) encompasses the packaging of the product into boxes (31) and placement onto pallets (32). The packaging process benefits from the lightweight nature of the product, allowing for the efficient packing of substantial square footage into boxes that remain under eighteen pounds, a distinctive attribute not commonly found in the industry.

Figure 3:
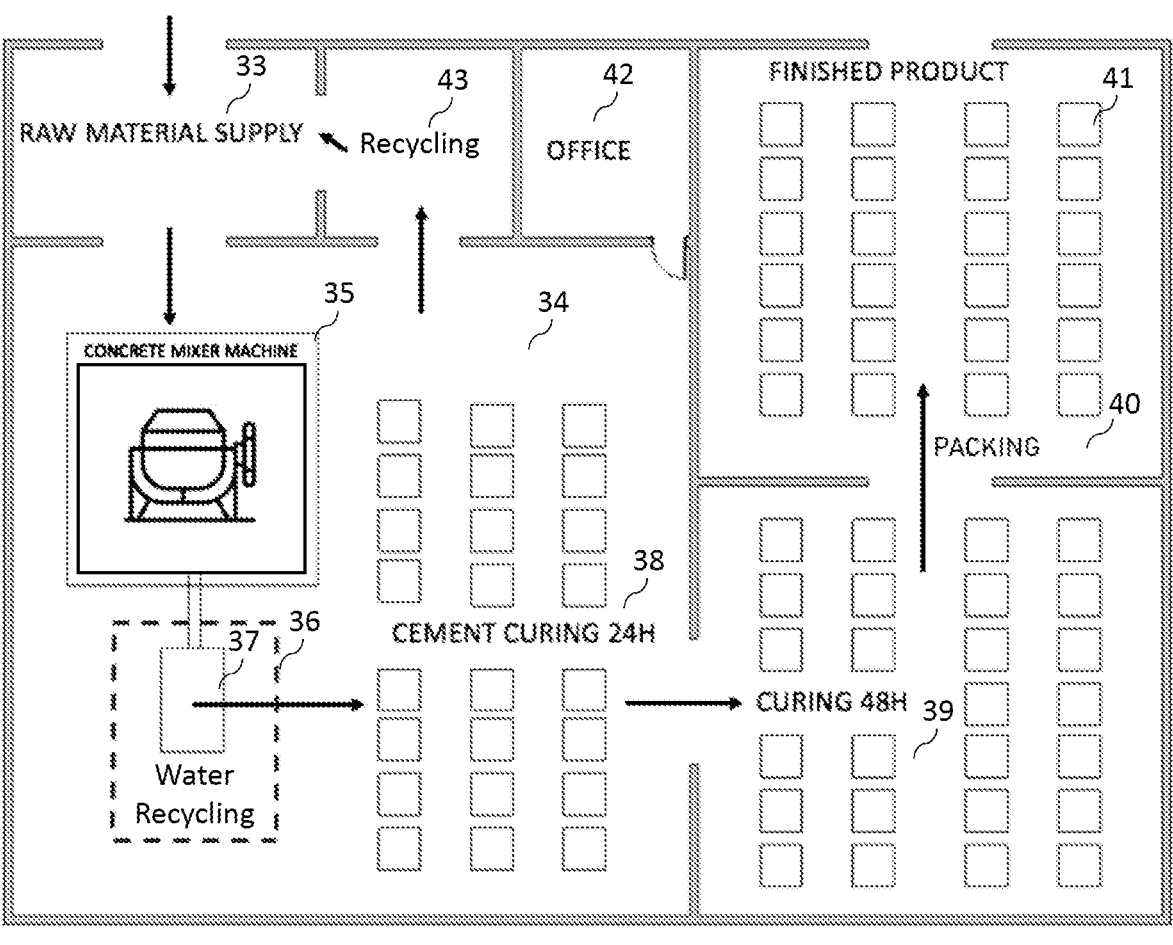
FIG. 3 is schematic diagram of the layout of a production plant in an embodiment of a Lightweight Veneer System and Method in accordance with the present invention.

FIG. 3 presents a schematic layout of the production facility for the Lightweight Veneer System and Method, showcasing the logical flow from raw material reception to the final product dispatch. Each reference number denotes a crucial stage or element within the facility, illustrating the efficient use of space and resources to streamline the production process. At reference number (33), the Raw Material Supply area serves as the entry point for all inputs required for the production process. It is the initial receiving section where materials are sorted and prepared for their respective roles in the creation of the lightweight veneer. In the main area (34), the Concrete Mixer Machine (35), is the central piece of equipment where the raw materials are transformed into the veneer mix. The mixer is designed to handle the specific proportions and components of the veneer formula, ensuring a consistent and homogenous mixture. Reference number (36) represents the Water Recycling system, an environmentally conscious feature of the facility. This system recovers and reuses water from the production process, minimizing waste and conserving resources. Through a decantation process, in the filling and vibration station (37) the lightweight material is recovered as it floats, and the water settles and is reused in the process. In a similar vein, reference number (43) indicates the general Recycling area, where defective materials are processed. Within the first twenty-four hours, any faulty product is ground down and reintroduced into the production cycle, demonstrating the sustainable practices embedded in the operation. The "Cement Curing 24H" area, marked by reference number (38), is where the newly cast veneer begins its setting process. This area is carefully controlled to provide the optimal conditions for the initial cure of the cement-based product. The process continues in the "Curing 48H" area, denoted by reference number (39), where the veneer undergoes an extended curing period. This ensures that the product achieves the necessary hardness and durability. Humidity is measured with random monitoring with a moisture analyzer or hygrometer. If it reads above 20%, it needs more time in the curing room. Alternatively, an experienced operator can control the weight of the veneer at the time of packaging, returning the product to the curing room in case it is not ready yet. Reference number (40) is the Packing area. Here, the veneer is boxed and prepared for shipment. The lightweight nature of the product allows for efficient packaging, which translates into cost-effective transportation. The Finished Product storage, shown at reference number (41), is where the fully cured veneer is kept before packaging. This area is organized to facilitate easy access to the products for final dispatch. Finally, the Office space, denoted by reference number (42), serves as the administrative hub, overseeing the operation from procurement to production and dispatch.

The layout as depicted in FIG. 3 is a model representation of the facility and should be understood as such. It is to be noted that variations in the layout are plausible, providing the flexibility to adapt to different site conditions, production requirements, or technological advancements. The layout is designed to be scalable and modifiable, ensuring that the Lightweight Veneer System and Method can evolve with the company's growth and the industry's innovation.

The description as set forth is not intended to be exhaustive or to limit the invention to the precise form disclosed. Many modifications and variations are possible in light of the teachings above without departing from the spirit and scope of the forthcoming claims.

The invention claimed is:

1. A method for manufacturing a lightweight veneer, said method comprising:

a. introducing thirty-two liters (±10% tolerance) of water into a concrete mixer machine;

b. adding one kilogram (±5% tolerance) of acrylic polyester resin;

c. mixing for at least one minute;

d. adding 9 kg (±5% tolerance) of recycled ground glass;

e. mixing for at least one minute;

f. adding 6 kg (±10% tolerance) of calcium carbonate (marble dust);

g. mixing for at least one minute;

h. adding 30 grams (±10% tolerance) of fiberglass;

i. mixing for at least one minute;

j. adding 21.5 kg (±5% tolerance) of one of white cement or gray cement;

k. mixing for at least two minutes;

l. adding 9 kg (±10% tolerance) of masonry plaster;

m. mixing for at least thirty seconds; obtaining a final mixture n. preparing molds with release agent;

o. transferring the final mixture into the molds within seven minutes, obtaining filled molds;

p. covering said filled molds with plastic, obtaining covered molds;

q. placing the covered molds in a primary curing area with controlled temperature (20 to 30 degrees Celsius) and humidity (50 to 60%);

r. letting stand the covered molds in the primary curing area for 24 hours;

s. placing the covered molds in a secondary curing area with controlled temperature (25 to 35 degrees Celsius) and humidity (50 to 60%);

t. letting stand the covered molds in the primary curing area for 48 hours, obtaining a final veneer; and u. verifying moisture content of the final veneer, wherein if said moisture content is below 20%, the final veneer is considered ready for packaging, whereas if said moisture content is above 20% molds are covered with plastic again and placed in the secondary curing area with controlled temperature (25 to 35 degrees Celsius) and humidity (50 to 60%) for an additional 8 hours, repeating this step until said moisture content is below 20%.

2. The method for manufacturing a lightweight veneer of claim 1, further comprising after step n, the step of painting the molds with iron oxides in an irregular and sporadic manner to obtain a natural-looking finish.

3. The method for manufacturing a lightweight veneer of claim 1, further comprising after step u, the step of detecting and grounding down any faulty product obtaining grounded veneer, and reintroducing said grounded veneer into the production cycle in step d, in replacement of any quantity of recycled ground glass between 0 and 9 kg (±5% tolerance).

* * * * *